(12) United States Patent
Wordsworth (10) Patent No.: US 9,951,662 B2
(45) Date of Patent: Apr. 24, 2018

(54) GENERATOR SET

(71) Applicant: BOSS CABINS LIMITED, Lincolnshire (GB)

(72) Inventor: Harold Duncan Wordsworth, Lincolnshire (GB)

(73) Assignee: BOSS CABINS LIMITED, Lincolnshire (GB)

(*) Notice: Subject to any disclaimer, the term of this patent is extended or adjusted under 35 U.S.C. 154(b) by 0 days.

(21) Appl. No.: 15/131,279

(22) Filed: Apr. 18, 2016

(65) Prior Publication Data

US 2016/0326922 A1 Nov. 10, 2016

(30) Foreign Application Priority Data

May 6, 2015 (EP) ..................................... 15166656

(51) Int. Cl.
| | | |
|---|---|---|
| F01M 1/02 | (2006.01) | |
| F01M 1/16 | (2006.01) | |
| F02B 63/04 | (2006.01) | |
| F01M 1/12 | (2006.01) | |
| F16N 19/00 | (2006.01) | |
| F01M 11/04 | (2006.01) | |

(52) U.S. Cl.
CPC ................ *F01M 1/16* (2013.01); *F01M 1/12* (2013.01); *F02B 63/04* (2013.01); *F16N 19/00* (2013.01); *F01M 2001/123* (2013.01); *F01M 2011/0416* (2013.01)

(58) Field of Classification Search
CPC ...... F01M 1/16; F01M 1/12; F01M 2001/123; F01M 2011/0416; F16N 19/00; F02B 63/04
See application file for complete search history.

(56) References Cited

U.S. PATENT DOCUMENTS 2,584,877 A * 2/1952 Hoffman ................ F01M 5/007
   123/196 AB
4,151,823 A    5/1979 Grosse et al.
4,226,214 A   10/1980 Palazzetti
(Continued)

FOREIGN PATENT DOCUMENTS

GB       143454      5/1920
JP    H06336908 A   12/1994
(Continued)

OTHER PUBLICATIONS

Extended European Search Report dated Oct. 15, 2015 for Application No. 15166656.7.

*Primary Examiner* — Hung Q Nguyen
(74) *Attorney, Agent, or Firm* — Moser Taboada (57) ABSTRACT

A diesel engine generator set comprising an electric generator, an internal combustion engine having an internal sump for collecting oil, and an oil reservoir external of the engine. The engine includes an oil inlet port opening into the internal sump, and connected to an outlet of the oil reservoir, and an oil outlet port connected to an inlet of the oil reservoir, such that a flow circuit is defined between the internal sump and the oil reservoir. The flow circuit comprises flow control means for selective control of oil flow between the internal sump and oil reservoir, such as one or more valve and/or pump. A controller may control flow between the internal sump and the external oil reservoir.

14 Claims, 5 Drawing Sheets

(56) References Cited

U.S. PATENT DOCUMENTS

| | | | |
|---|---|---|---|
| 5,062,398 A | | 11/1991 | Bedi et al. |
| 5,159,910 A | * | 11/1992 | Ninomiya ................ F01M 1/12 123/196 AB |
| 5,509,381 A | | 4/1996 | Fisher |
| 6,167,978 B1 | | 1/2001 | Smietanski |
| 2009/0173580 A1 | | 7/2009 | Papas |
| 2012/0240892 A1 | | 9/2012 | Carmen et al. |

FOREIGN PATENT DOCUMENTS

| | | |
|---|---|---|
| JP | 2006029130 A | 2/2006 |
| JP | 2006152860 A | 6/2006 |
| JP | 2006249939 A | 9/2006 |
| JP | 2006249957 A | 9/2006 |
| JP | 2007127021 A | 5/2007 |
| JP | 2007198311 A | 8/2007 |

\* cited by examiner

GENERATOR SET

CROSS-REFERENCE TO RELATED APPLICATIONS

This application claims the benefit of European Patent Application No. 15166656.7 filed on May 6, 2015, and the contents of which are incorporated by reference herein.

BACKGROUND

Field of the Invention

The present invention relates to engine-generator sets, and more particularly, although not exclusively, to lubrication systems for use therewith.

Conventional engine-generator sets (also known as generator sets or gen-sets) typically comprise a combination of a combustion engine and a generator, as well as various ancillary devices, and are used to generate electricity. The combustion engine drives the generator rotor so as to generate electricity on demand.

Generator sets are used in a wide variety of circumstances, often where connection to a power grid is unavailable, for example in remote locations or on construction sites etc., as well as being used as emergency/back-up power supplies in case of failure of a power grid. Generator sets commonly operate on diesel fuel, yet there are many problems associated with the use of diesel engines for such an application.

If diesel engines are run at either low speeds or low loads, for example when a generator set is left idling as a so-called "standby" generator, or when a low load is applied to a higher powered engine, then incomplete combustion of the fuel can occur, leading to carbon fouling or 'coking' issues. Incomplete combustion of the fuel leads to carbon formation in the engine, which in turn damages engine components, such as injectors, piston rings, as well as the seals that the piston rings form. As a result of the decreased sealing capacity caused by this damage, hot combustion gases are able to reach, and thereby potentially ignite, oil in the system (often indicated by the engine producing blue smoke), which reduces the amount of oil present for lubrication purposes.

In addition, incomplete combustion of the fuel may cause the formation of acids in the engine oil, which may cause further damage to the engine components over time.

In view of the above it is clearly desirable to operate the engine at higher loads and speeds. Furthermore it is conventionally the case that a diesel engine must be run at high revs in order to achieve the desired relative alternator speeds required for electricity generation. However this too has associated disadvantages. Higher operating speeds of the engine result in an increase in temperature and wear.

Such issues, amongst others, increase the likelihood of engine faults and require the engine to be service done a regular basis, which thereby increases the maintenance costs associated with diesel generator sets. Such costs can contribute to a significant proportion of the overall costs of running a generator set.

There is now provided an improved lubrication system which overcomes or substantially mitigates one or more of the aforementioned and/or other disadvantages associated with the prior art.

SUMMARY

According to an embodiment of the invention there is provided an engine generator set comprising an electric generator, an internal combustion engine having an operating sump for collecting oil to be circulated around the engine in use, and an oil reservoir external of the engine, the engine including oil inlet and outlet ports in fluid communication with respective oil outlet and inlet ports of the oil reservoir, such that an oil flow circuit is defined between the diesel engine and the oil reservoir.

A flow regulator (e.g. a valve) may be provided in the flow path between the oil reservoir and engine, e.g. in the flow path from the oil reservoir to the engine and/or from the engine to the oil reservoir. One or more flow regulator may be located at the inlet or outlet of either or both of the oil reservoir and engine, e.g. an inlet/outlet of the operating sump. The regulator may comprise a shut-off valve and/or may be variably openable. The flow regulator may permit or inhibit oil flow between the operating sump and the oil reservoir.

The flow regulator may be under the control of a controller, e.g. such that regulator operation is automated. The flow regulator may be selectively openable/closable according to one or more engine operation parameter. The controller may control closing of the regulator upon or during operation of the engine. The controller may inhibit opening of the regulator during operation of the engine. The controller may control opening of the regulator upon termination of an instance of engine operation or a predetermined time thereafter, e.g. when the engine is inoperative.

The controller may control opening of the regulator after a predetermined duration of use of the engine.

The controller may open the regulator for a predetermined time period. The controller may close the regulator after a predetermined time for which the regulator is open has elapsed. Such features may be beneficial in that the controller can effectively control an oil change for the operating sump without the need for manual engine maintenance work. In some examples, oil flow between the oil reservoir and internal sump may be permitted during engine use.

The operating sump may be located internally or on-board the engine, for example within an engine block or housing. The oil reservoir may be located externally of the engine block or housing. The engine may comprise a wet sump system or arrangement, e.g. where an excess of oil is collated in the operating sump.

The oil reservoir may comprise a reservoir housing, which may be attachable to the generator set, e.g. adjacent or separate from the engine.

The operating sump may be of a conventional wet sump volume/design for its engine size.

The externally located oil reservoir may increase the total volume of oil present in the generator set, e.g. compared to a conventional wet sump, thereby increasing the interval between necessary maintenance for the diesel engine, and reducing associated maintenance costs. The flow path provided by the circuit may allow for increased heat dissipation from the oil, thus increasing the lifetime of the oil, and may lead to lower maintenance costs. The added heat dissipation may also help promote cooling of the engine to further decrease operational problems, i.e. increasing the service interval.

The engine is typically a diesel engine, such that the generator set is typically a diesel generator set. The generator set may comprise the combination of the engine, electric generator with other ancillary components. The generator set may be free standing/modular in form, for example with the engine, generator and oil reservoir mounted on a common chassis or support structure. The generator set may be portable in that it may be manually or machine lifted as a unit.

The oil reservoir may have a volume that is greater (e.g. substantially greater) than the volume of the operating sump. The oil reservoir may have a volume that is two or more times greater than the operating sump, such as in the region of 2-10 times larger than the volume of oil retained in the internal/operating sump. The oil reservoir most preferably has a volume in the region of 3-5 times larger than the volume of the operating/internal sump.

The generator set may be adapted to store a larger-than-conventional volume of oil. That is to say, the combination of the operating sump and oil reservoir is greater than that of a conventional sump for a corresponding engine/generator size or capacity. Such a significant increase in the total volume of oil available in the generator set results in an increased lifetime for the oil, leading to an increased time period between necessary service intervals, and thereby lower associated maintenance costs.

The generator set may be adapted to circulate oil from the oil outlet port of the engine to the oil inlet port of the engine. For example the generator set may be configured such that oil flows from the oil outlet port of the engine to the oil inlet port of the engine under the action of gravity, or applied pressure, or the like. The engine outlet port is typically located above, i.e. at a greater height than, the engine inlet port in use. The engine outlet port may open into a pressurized portion of the engine oil system.

The height of the oil reservoir relative to the operating sump may be fixed such that a desired operating volume of oil is maintained in the operating sump.

The engine inlet port may or may not feed/open into, e.g. directly, into the operating sump. Any of the inlet/outlet ports of the engine and/or oil reservoir may comprise a conduit adapter/connector. A male inlet/outlet conduit connector may be provided on the exterior of the engine.

The generator set may comprise flow inducing means for inducing a flow of oil around the circuit. The flow inducing means may be located in any region of the flow path defined by the circuit. The flow inducing means may be located in the oil reservoir or in the flow path between the engine/sump and the oil reservoir.

The generator set may comprise an oil pump. The pump may be arranged to apply a positive pressure to oil within the oil circuit and/or reservoir, e.g. by way of a head of oil therein and/or a positive internal fluid pressure above atmospheric pressure. The pump may comprise a mechanical or electric pump. The pump may be powered/driven by the engine, e.g. by the crankshaft or an electricity store, e.g. powered from the engine/generator.

A pump may be provided in the flow path/circuit from the engine to the oil reservoir, or vice versa. The pump may be external of the engine block and may be connected to an inlet or outlet of the oil reservoir or operating sump or a flow line there between. The pump may be selectively operable by a controller and/or in dependence upon an operating parameter of the engine. For example the pump may be operated to drive oil flow to/from the oil reservoir under one or more predetermined condition. The pump may or may not be operable only when the engine is switched off, e.g. by inhibiting pump operation when the engine is operating.

The pump may be operated to drive oil flow to/from the oil reservoir, e.g. automatically, for a predetermined time period after sensing of an engine operating condition. The pump may operate for a fixed duration upon shut down of the engine or thereafter, for example to circulate oil only after an instance of engine use has finished. The pump may be operated automatically, e.g. by a controller, in response to the sensed engine condition.

The pump may be operated in conjunction with control of a flow regulator (e.g. a valve) in the oil flow circuit.

The flow rate of oil through the circuit may be in the region of 0.1-0.5 liters per minute. The flow rate of oil through the circuit is most preferably in the region of 0.25 liters per minute.

The generator set may be adapted to facilitate heat dissipation from the oil contained within the circuit. The connection or flow line between the oil inlet port and the outlet of the oil reservoir and/or the connection between the oil outlet port and the inlet of the oil reservoir may be shaped so as to increase the distance of the flow path traveled by the oil in the circuit, for example defining a non-linear flow path and/or comprising a flexible conduit.

The oil reservoir and/or the internal volume of the oil reservoir may or may not be shaped so as to a non-linear or tortuous flow path between the oil reservoir inlet and outlet. The oil reservoir may comprise at least one internal formation for diverting the flow path of oil travelling there through, for example one or more baffle, partition wall or the like. The oil reservoir may be adapted to increase the distance of the flow path traveled by oil in the circuit.

Thus the distance, and thereby the time taken, for oil to travel around the circuit may be increased. This may be beneficial in that it may provide an increased period of time and flow path over which heat may dissipate from the oil, resulting in the oil in the circuit having an increased lifetime, and thus reduced maintenance costs.

The oil reservoir may be thermally isolated from the engine, for example by being mounted at a location spaced from the engine and/or being separated from the engine by a thermal barrier material. The oil reservoir may comprise one or more heat dissipation member to promote conduction of heat away from the oil, such as one or more internal or external baffle, wall or fin. The internal formation(s) of the oil reservoir defining the flow path of the oil may also provide heat transfer. A housing and/or internal formation of the oil reservoir may be formed of, or comprise, a conductive material, such as a metal.

The generator set may comprise means for altering/filtering the composition of the oil contained in the circuit. The means may be located in any region of the flow path defined by the circuit and may be downstream of an oil flow inducing means. The oil composition altering/filtering means is preferably located in the flow path between the oil outlet port of the engine and the inlet of the engine. The means may be located in the flow path to/from the oil reservoir and/or in the reservoir interior. The diesel generator set may comprise a filter, for example a pressure filter, and air release filter, or an impurity filter. The filter may be located externally of the engine (e.g. instead of or in addition to a conventional oil filter on-board the engine).

The oil reservoir may comprise an access port. The oil reservoir may comprise a breathable port, for example to allow controlled passage of air to/from the reservoir. Thus the oil present in the circuit may be accessed without the need to expose the engine to an external environment. The access port may comprise a closure, such as a cap or bleed plug, which may, for example, comprise a bleed valve. Thus oil may be drained from the system via the bleed plug.

In any example of the invention, the oil is typically a lubricating or tribological oil, e.g. as being distinct from a fuel for the engine.

The generator may generate electrical power in the region of 2-20 kVA, such as for example less than 15 or 10 kVA. A 3-10 kVA generator set may be provided.

The oil reservoir may comprise a filler port, which may be selectively openable. The filler port may comprise a filler cap and/or filter. A filler/breather cap may be provided.

A flow regulator, such as a flow control valve or check valve, may be provided in the return flow path from the oil reservoir outlet to the engine oil inlet. The valve may be provided at the engine inlet. A pressure/flow regulator may be provided in the flow path from the engine/sump to the oil reservoir.

The oil outlet port may be adapted such that oil is removed from the engine in the return path of oil from the engine, i.e. the moving components thereof, to the internal sump. Alternatively, the oil outlet port may be adapted such that oil is removed from the internal sump. The oil outlet port may extend from the internal sump. The oil inlet and/or oil outlet port may be spaced/adapted to prevent immediate transfer of oil from the oil inlet port to the oil outlet port, e.g. opening at different regions or heights of the internal sump or engine.

The engine oil inlet and/or outlet may be comprised with or retained by a sump plug or the like. The oil inlet and/or oil outlet ports may extend through the sump plug. The oil inlet and/or oil outlet ports may be integrally formed with the sump plug. The sump plug may comprise a connector for attachment of an oil inlet and/or outlet supply tube. The sump plug may be removably and/or resiliently held in a corresponding port in the operating sump, e.g. in a lower wall thereof. The nature of such a removable sump plug means that the removable sump plug may replace an existing sump plug on a conventional diesel generator, thus allowing the simple retrofitting of an external oil reservoir to a conventional diesel generator. The inlet and outlet ports may extend from the sump plug in a direction into the interior of the operating sump by different distances/heights. The inlet and outlet ports may be staggered.

In an additional or alternative embodiment, the engine oil inlet or outlet may be provided by an engine oil dipstick or filler port. Typically the engine oil inlet may be provided by an adapter/plug arranged to be held within the engine oil dipstick or filler port. The adapter/plug may comprise a port and/or connector for attachment to the oil inlet or outlet supply tube. One of the inlet and outlet may be provided via a sump plug adapter, whilst the other of the inlet and outlet may be provided by a dipstick filler port adapter.

Thus, according to a further embodiment of the present invention there is provided an oil system for use with a diesel generator, the system comprising an oil reservoir for storing oil, and a sump plug adapted to form a sealing arrangement with a wall of an operating sump of a diesel engine, the sump plug comprising an oil inlet port and/or an oil outlet port, the oil inlet port connected with an outlet of the oil reservoir and/or the oil outlet port connected with an inlet port of the oil reservoir, such that a flow path is defined between the oil reservoir and the sump plug.

According to another embodiment of the present invention there is provided a system for use with an internal combustion engine, the system comprising an oil reservoir for storing oil, and a sump plug adapted to form a sealing arrangement with a sump of the engine, the sump plug comprising an oil inlet port and/or an oil outlet port, the oil inlet port connected with an outlet of the oil reservoir and/or the oil outlet port connected with an inlet port of the oil reservoir, such that at least one flow path is defined between the oil reservoir and the sump plug.

There may be provided a cabin or other portable or temporary accommodation structure comprising an engine or generator set according to the invention. The generator set may power one or more electrical circuit within the cabin/structure.

It is proposed that the invention be applied to static engine driven generator applications, rather than vehicular or propulsion engine applications. The present invention finds particular use where an existing engine design can be simply retrofitted to allow use of an external/additional sump, without need for complex modification of the engine itself.

BRIEF DESCRIPTION OF THE DRAWINGS

Practicable embodiments of the invention are described in further detail below with reference to the accompanying drawings, of which.

DETAILED DESCRIPTION

Figure 1:
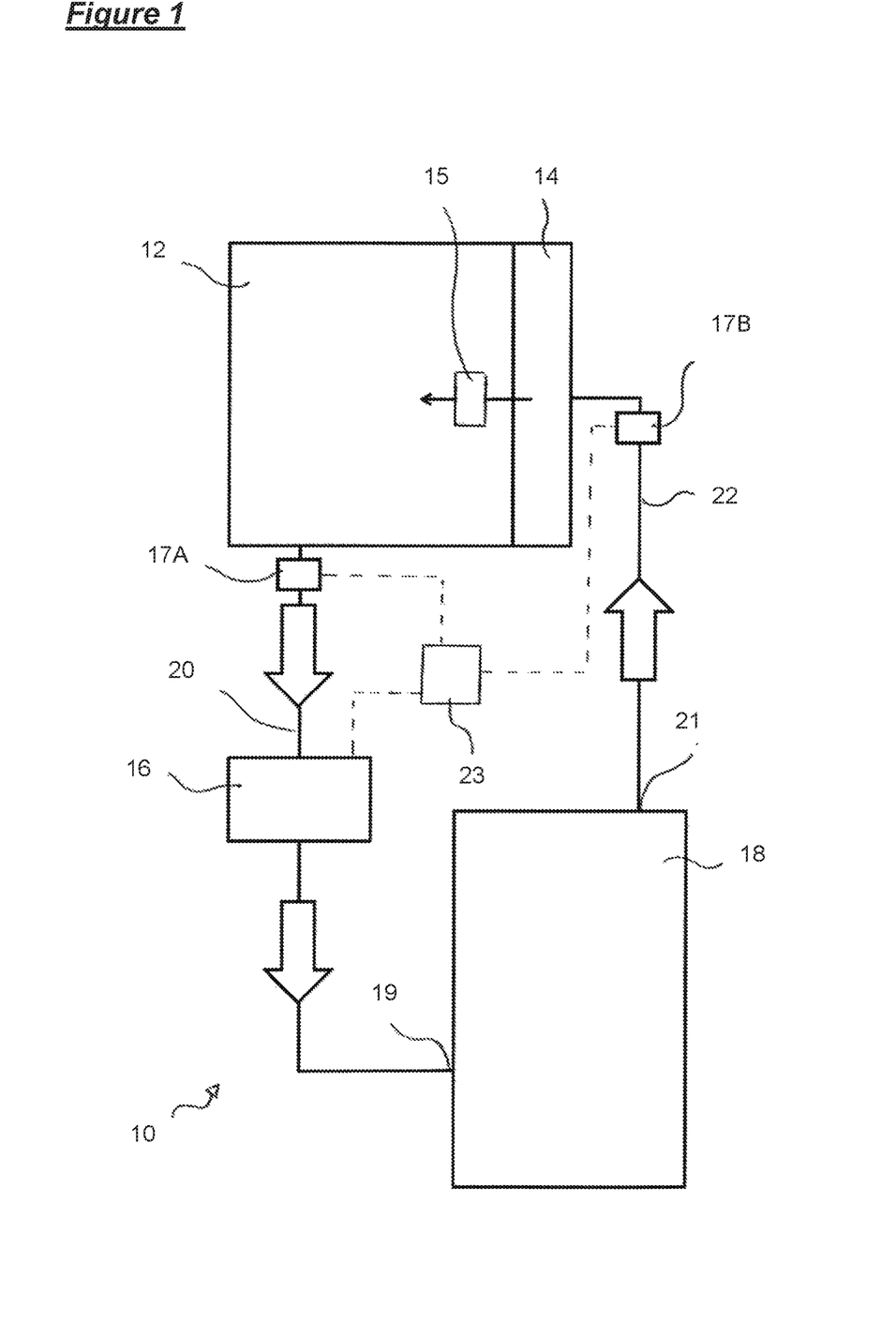
FIG. 1 is a flow diagram of a lubrication system according to a first example of the present invention.
Figure 2:
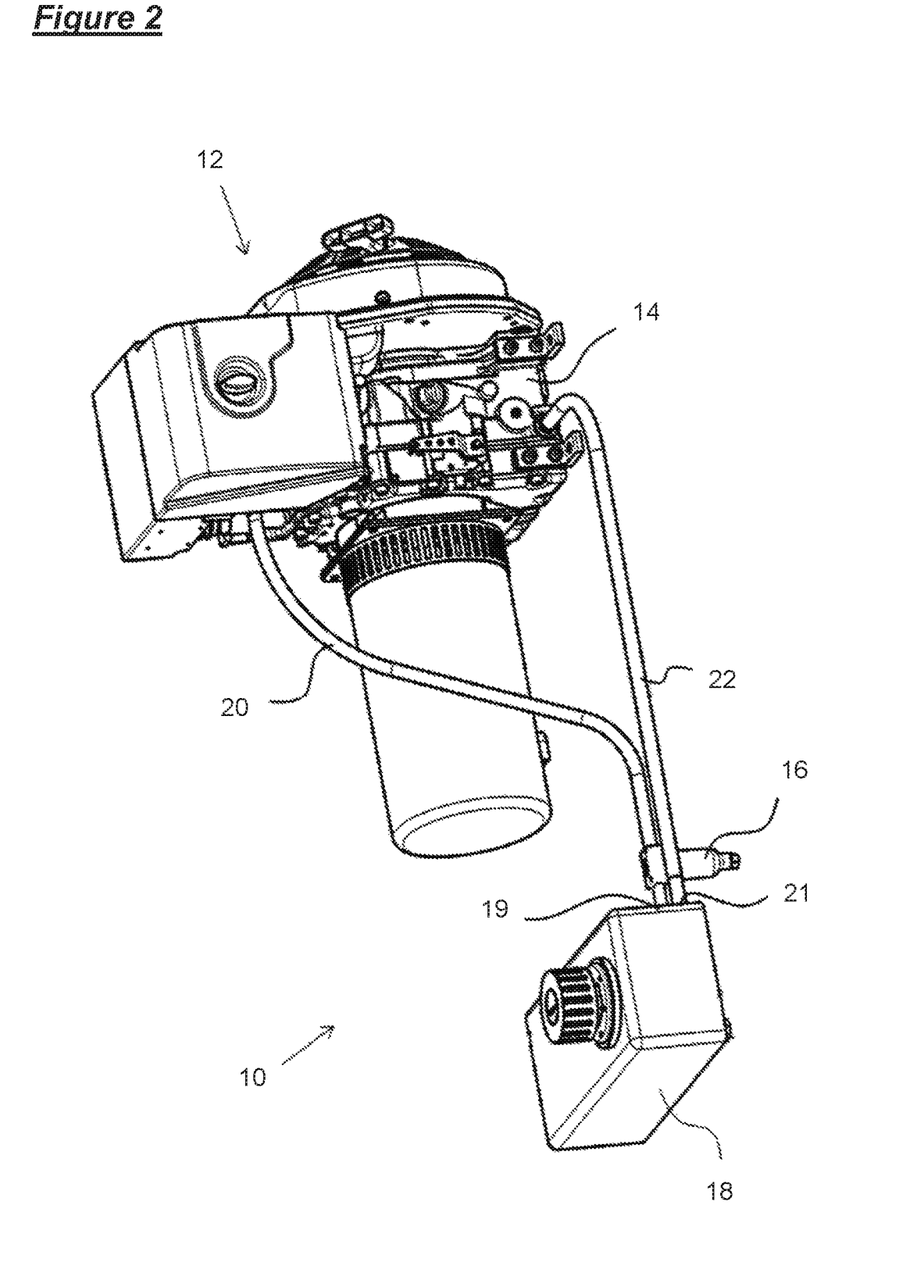
FIG. 2 is a three-dimensional perspective view of the system of FIG. 1.

A first embodiment of a system (or diesel generator set) according to the present invention, generally designated 10, is shown in FIGS. 1 and 2. The system 10 comprises a diesel generator 12 having a sump (otherwise known as an oil pan) 14, a pump/filter unit 16, and an external reservoir (or sump) 18. The diesel generator 12 is connected to the external reservoir 18 via a first outlet pipe 20, and the external reservoir 18 is connected to the sump 14 via a second inlet pipe 22. The specific form of the external reservoir 18 is not important for operation of the system, and the fundamental requirement of the external reservoir 18 is that it comprises a fluid-containing housing having an inlet and an outlet.

The unit 16 optionally comprises an oil pump and/or filter. The pump drives flow of oil in the direction of the arrows in FIG. 1 along pipes 20 and 22 between the engine and reservoir 18. A conventional oil pump may be used for this purpose and is typically electrically driven and electronically controlled as will be described herein.

Whilst the presence of the filter is described in conjunction with the pump 16, it is noted that the system 10 will perform adequately without such a filter. Furthermore, it will be recognized that the filter 16, if utilized, may be placed at any appropriate point in the flow path, and need not be located with the pump. For convenience the filter is shown in FIGS. 1 and 2 at a location between the diesel generator set 12 and the external reservoir 18. In other examples, a filter could be provided within the reservoir 18 housing, for example as a removable cartridge filter or similar, or else in the return flow pipe 22.

One or more valve 17 is provided within the system to control the flow of oil between the engine/generator 12 and oil reservoir 18. In this example a valve 17A is provided for controlling flow to the reservoir and a further valve 17B is provided for controlling flow from the reservoir to the engine. It is possible that the system could comprise only one such valve 17A or 17B in order to control flow between the engine and reservoir. However two valves may allow greater selective control of the respective oil levels in the reservoir 18 and sump 14 (e.g. allowing filling/emptying of the reservoir relative to the sump and vice versa).

A controller 23 may be provided for control of the one or more valve 17 and/or pump 16 as will be described herein. The controller 23 may comprise any suitable decision-making unit, capable of inputting and outputting wired or wireless signals, for example so as to be able to output control instructions based upon incoming sensor readings. A conventional programmable chip could be provided with machine readable instructions in order to provide the decision-making functionality described herein.

When in use, the system 10 further comprises oil (not shown in the Figures), which is stored in both the sump 14 and the external reservoir 18. The flow of oil through the system 10 is indicated in FIG. 1 by arrows, and thus in the flow diagram oil moves in a generally anti-clockwise direction.

It is to be appreciated that the diesel generator 12 that is to be used in the system 10 may be any conventional diesel generator, or alternatively may be a diesel generator that has been specifically modified for use in the system 10. Whilst a diesel engine is most typical, any internal combustion engine having an internal sump could be accommodated. Similarly, the internal sump 14 may be a conventional sump that is found in a conventional diesel, or other, generator engine.

Thus, upon initial operation of the system 10, the system 10 behaves in a manner that is similar to a conventional wet sump, in that oil is pumped from the sump 14 into the diesel engine 12, so as to provide lubrication. The internal lubrication system of the engine 12 is conventional and comprises a pump 15 for driving flow of oil to the relevant components for the engine for tribological and cooling purposes. However, the first/outlet pipe 20 is located in a region of the return path of oil from the diesel generator 12 to the sump 14, such that some or all of the oil does not flow directly back to the sump 14 after passing though the moving parts of the engine, as is the case in a conventional wet sump, and instead flows along the flow passage provided by the first/outlet pipe 20, towards the external reservoir 18. The oil enters the external reservoir 18 through an inlet (19), flows through the interior of the housing of the external reservoir, and passes through an outlet (21), into the flow passage defined by the second/inlet pipe 22. Oil flows along the second/inlet pipe 22, into the sump 14, such that the oil system defines a circuit comprising, in flow order, the sump 14, the engine 12 and the oil reservoir 18. Thus the above-described process may be repeated with continuous flow of oil round the circuit when the engine is in use.

It is appreciated that a conventional diesel generator having a conventional sump, may need to be modified for connection to the first outlet pipe and/or the second inlet pipe, for example via the introduction of a port and/or connector formation. One or more valve 17 may be provided at a corresponding inlet and/or outlet port.

The presence of the external reservoir 18 in the system 10 allows for a much greater volume of oil to be present in the system 10, which may reduce the operational burden per unit volume of oil and thereby improve the tribological effect and/or lower the regularity with which maintenance on the engine is required or the oil in the system 10 needs to be changed. Furthermore, the flow path defined by the first outlet pipe 20, the external reservoir 18, and the second inlet pipe 22, greatly increases the distance that oil has to travel in order to return to the sump 14 from the diesel generator 12, which may provide for increased cooling of the oil prior to re-entry into the diesel generator 12. One further surprising benefit is that the latency of the oil in the reservoir allows at least some contaminants in the oil, such as particulates, to settle and thereby collect in the reservoir.

Whilst a pump unit 16 is provisionally shown in the embodiment of FIG. 1, it may not be essential in this example if the engine's internal oil pump 15 is sufficient to provide flow to the oil reservoir. In such an example, the unit 16 could comprise a filter or could be removed altogether. In a conventional engine, the pump 15 will typically be tailored to the volume and flow rate of oil required by the engine alone and may not accommodate the additional flow requirements for the external reservoir. Thus a supplemental pump 16 may be used to drive flow to/from the reservoir or else the conventional pump 15 may be modified to account for the present invention. If used, the pump 16 and/or valves 17 may be controlled so as to impose a minimal change in flow rate or pressure within the oil flow in the engine, i.e. such that a conventional internal pump 15 and engine experience normal operation in use, save for the oil in the sump 14 being replenished with oil from the reservoir, thereby potentially being cooler and/or filtered relative to the oil normally returning to the internal sump 14 from the engine working parts.

The controller may receive one or more engine operation sensor reading and may adjust the valve(s) 17 and/or pump operation accordingly. For example the controller may receive sensor signals indicative of engine shaft speed, engine/oil temperature or the like and/or may monitor the duration of one or more period of operation.

Various control options are available. In one example, the controller could control the relevant pump and/or valve(s) 17 so as to induce oil flow between the reservoir 18 and engine 12 substantially continuously during engine operation at a constant or variable rate. Alternatively, the controller may await sensor readings and/or timings so as to determine whether the engine is running in a normal operating mode, i.e. after start-up or in substantially steady state operation, before initiating oil flow to/from the reservoir 18. In one example, the controller 23 may wait until a predetermined period of operation has elapsed, either in a single period of operation or a plurality of successive periods, before initiating oil flow to/from the reservoir 18.

Figure 3:
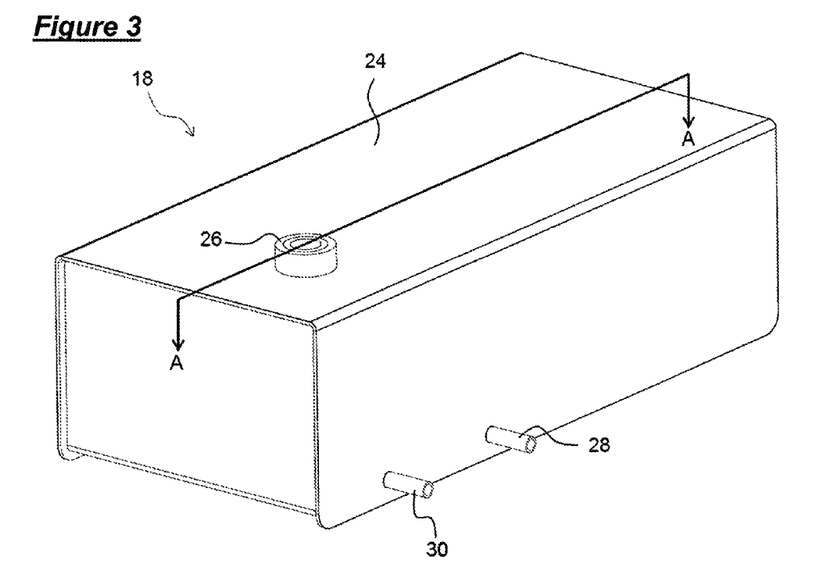
FIG. 3 is a three-dimensional perspective view of an external sump/reservoir for use with the system of FIG. 1.
Figure 4:
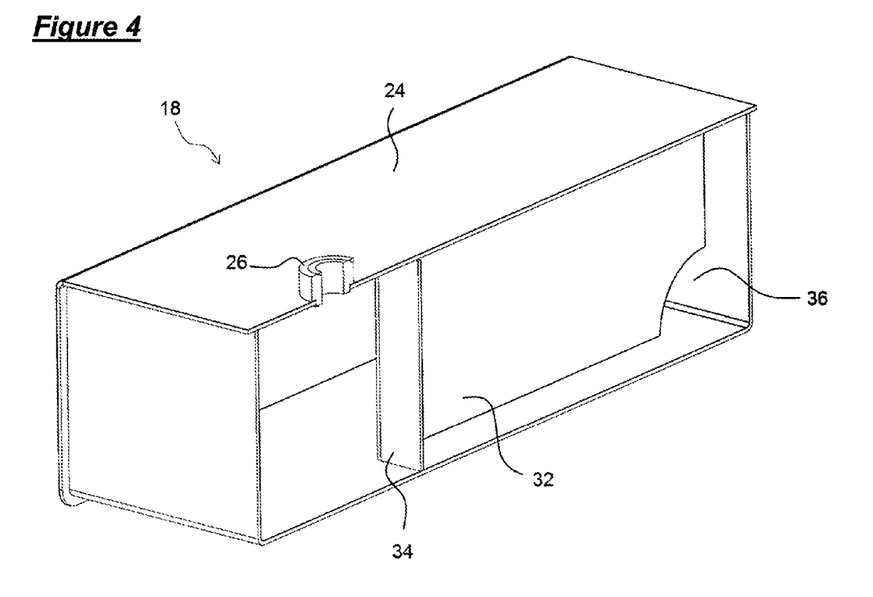
FIG. 4 is a sectional view along the line A-A of FIG. 3.

Whilst the specific form of the external reservoir 18 is not essential for the operation of the system 10, a preferred embodiment of an external reservoir 18 is shown in FIGS. 3 and 4.

The external reservoir 18 has a substantially constant rectangular cross-section, and is thus substantially cuboidal in form, although in other examples, the form of the oil reservoir could be modified to improve flow dynamics if necessary. The external reservoir 18 comprises a housing 24, which defines a substantially hollow interior.

The housing 24 comprises an access opening 26, an inlet 28, and an outlet 30.

The access opening 26 is located on an upper surface of the housing, and is in fluid communication with the interior of the housing 24, so as to allow the reservoir to be selectively filled or drained from the exterior by a user. The access opening may be provided with a closure to allow the opening 26 to be closed in normal use. A cap may be provided for this purpose such as a threaded or bayonet-fitting cap, which may engage with corresponding formation(s) on the housing, such as a spigot about the opening 26. A filler and/or breather cap may be provided. A breather cap would be air permeable so as to allow control of the pressure in the housing 24 by permitting ingress or egress of air in response to changes in oil level in the housing. The use of an openable closure allows topping-up of the oil without the need to disturb, or cease operation of, the engine. A filter may be provided at the inlet or in the return flow path to the engine to prevent any contaminants during filling passing to the engine.

Any air in the housing 24 may be maintained at substantially atmospheric pressure, for example such that the oil will flow substantially under gravity from the housing 24 to the sump 14 in use. In other examples, depending on the position/orientation of the housing relative to the engine 12, it may be desirable to maintain a slight positive internal pressure in the tank to ensure return flow to the sump 14.

In another example, the opening 26 may take the form of a bleed opening, which may be provided with a plug member. Any conventional bleed valve/plug arrangement may be provided so as to allow selective draining of the oil. Both an access opening and a bleed could be provided or else a single opening may perform a dual function as required.

Each of the inlet 28 and the outlet 30 are located in a lower corner of a lateral surface of the housing 24. Each of the inlet 28 and the outlet 30 are substantially aligned parallel to a lower surface of the housing, yet the inlet 28 and outlet 30 are spaced apart. The inlet 28 and the outlet 30 comprise connectors, i.e. male connectors, which may have substantially the same form and dimensions. The inlet 28 and outlet 30 connectors are generally cylindrical/tubular in form and define an internal passage that extends into the interior of the housing 24, such that each of the inlet 28 and outlet 30 are in fluid communication with the interior of the housing 24. The inlet 28 and outlet 30 are shaped and dimensioned so as to engage corresponding end formations/ends of the first pipe 20 and second pipe 22 respectively.

The inlet 28 and outlet 30 are spaced on either side of an internal baffle in the housing 24, such that oil cannot pass directly from the inlet to the outlet but must pass around the baffle.

The interior of the housing 24 comprises a baffle having first 32 and second 34 portions. The first portion 32 is substantially planar in form, and extends longitudinally along the interior of the housing 24, from a first end of the housing 24 to a region located between the inlet 28 and the outlet 30. The first portion 32 is located substantially midway along the width of the interior of the housing 24. The first portion 32 comprises an aperture 36, located in a lower corner of the first portion 32, adjacent to the first end of the housing 24.

The second portion 34 is substantially planar in form, and extends in a lateral direction relative to the first portion 32 (e.g. part way across the interior of the housing 24). The second portion 34 extends from a wall of the housing 24 located between the inlet 28 and the outlet 30 until it contacts the first portion 32. Thus the first 32 and second 34 portions of the baffle act to separate the interior of the housing 24 into first and second internal compartments that are in fluid communication via the aperture 36. The first and second compartments are not equal in size/volume such that the compartment fed by the inlet 28 is smaller in volume. This ensures the oil passes more quickly through the first compartment and then slows second compartment. This may help ensure a controlled, laminar flow in the second compartment, thereby facilitating settling of the oil.

The arrangement discussed above thereby increases the flow path through the external reservoir 18, which may also facilitate the cooling of oil as it passes through the system 10. In other examples, further baffles or fins (e.g. a plurality of substantially parallel fins) may be provided in the baffle interior to increase the heat transfer from the oil by conduction to the housing and thereby to the surrounding air.

The housing 24 and baffle(s) are typically formed of metal.

Figure 5:
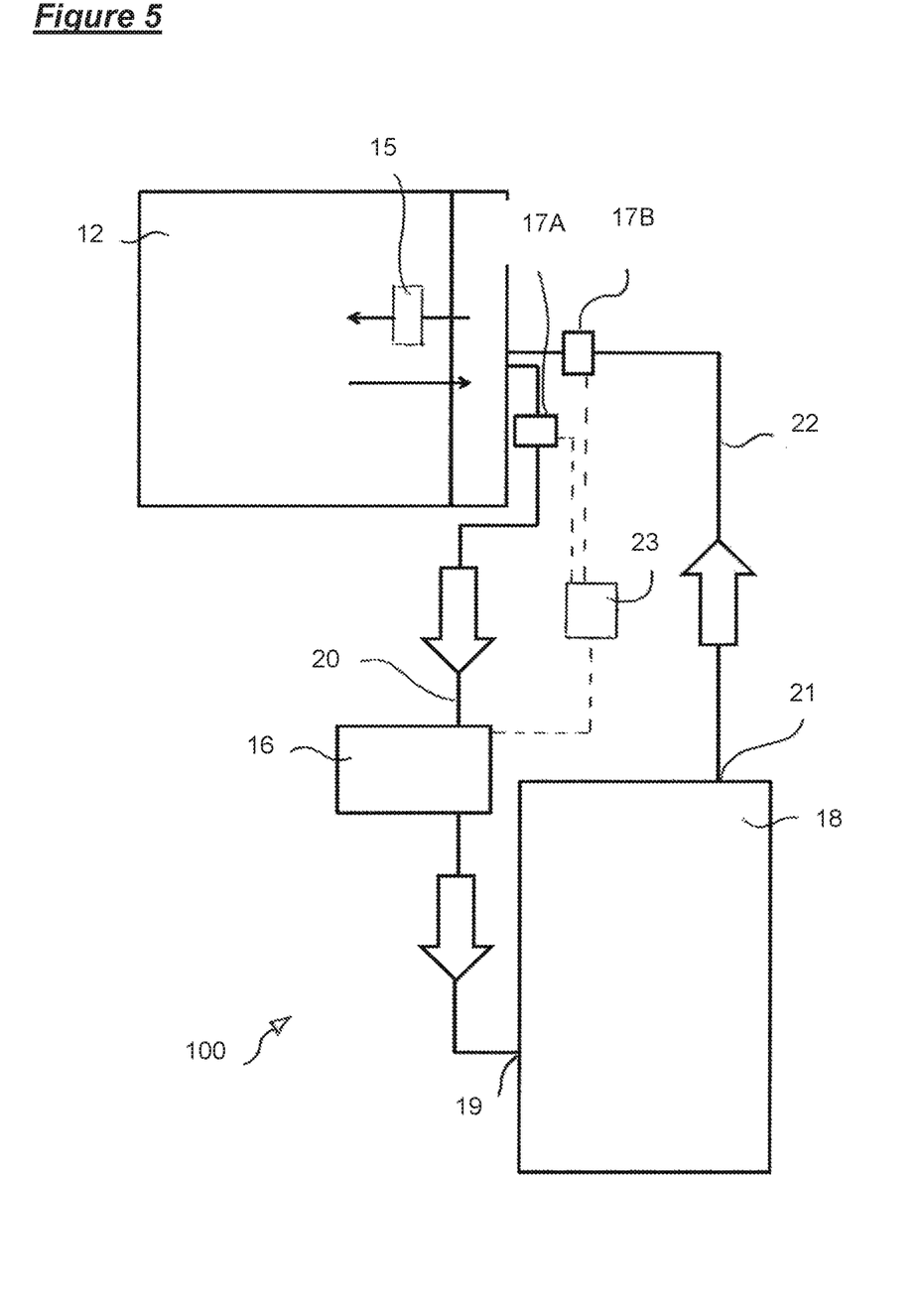
FIG. 5 is a flow diagram of a lubrication system according to a second example of the present invention.

A second embodiment of a system (or generator set) 100 according to the present invention is shown in FIG. 5. The second embodiment differs from the first embodiment in that the first outlet pipe 20 takes oil directly from the sump 14, as opposed to taking oil on the return path to the sump 14 from the diesel generator 12. Any other features and control options described above in relation to the first embodiment may apply to the second embodiment, save where differences are discussed below.

In the second embodiment, upon initial operation of the system 100, the system 100 behaves in a manner that is similar to a conventional wet sump, in that oil is pumped from the sump 14 into the diesel engine/generator 12, so as to provide lubrication. The oil is then simply allowed to flow/fall from the operational parts of the diesel engine/generator 12, under the action of gravity, back into the sump 14.

Oil in a first region of the sump 14, e.g. located to receive the flow from/after the return path from the diesel generator set 12, is actively drawn along the first/outlet pipe 20 by pump 16, and into the external reservoir 18. Oil passes through the external reservoir 18 and into the second/inlet pipe 22, where it then travels along the second inlet pipe 22 and is reintroduced into a second region of the sump 14, which is preferably spaced from the first region.

Figure 6:
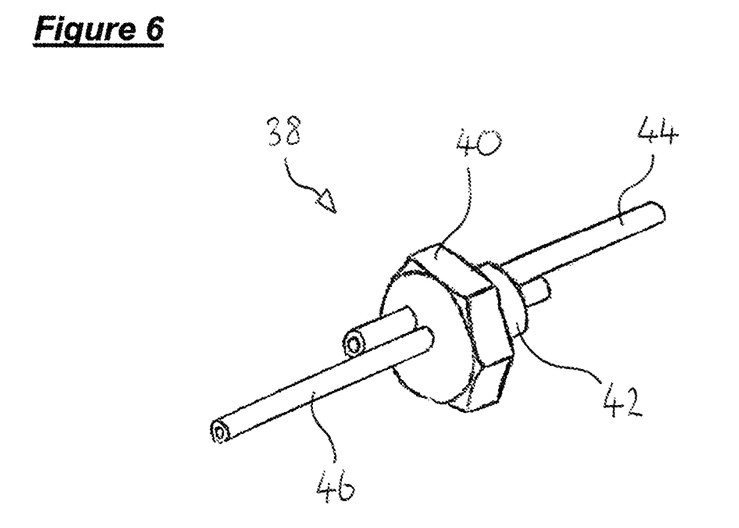
FIG. 6 is a three-dimensional perspective view of a sump plug for use with the system of FIG. 3.

For the second embodiment of the system 100, it is necessary that the sump 14 is provided with both an inlet and an outlet, and it is proposed that a conventional sump access point, which is usually blocked by an appropriate plug or the like, could be used for this purpose. A modified sump plug 38 for use with the second embodiment of the system 100 is shown in FIG. 6. In other examples, one or more additional port could be provided in the sump 14 for the purpose of the invention.

The sump plug 38 in FIG. 6 comprises a grip portion 40, a sealing portion 42, an inlet formation 44, and an outlet formation 46.

The grip portion 40 takes the form of a head and may be generally polygonal, e.g. hexagonalin plan, which thereby provides surfaces that are graspable by a user or device. A rearwardly facing surface of the grip portion 40 (not shown in the Figures) provides an abutment formation/surface for contacting an external surface of the sump 14 in use. The sealing portion depends from the head portion.

The sealing portion 42 has a substantially constant circular cross-section, such that the sealing portion 42 is substantially cylindrical in form. The sealing portion 42 extends rearwardly from a central region of the rearwardly facing surface of the grip portion 40, and has a diameter that is less than the height of the grip portion 40, such that the grip portion 40 and sealing portion 42 together have a plug-like form. The sealing portion 42 is shaped and dimensioned so as to substantially conform to a corresponding aperture in the sump 14. The length of the sealing portion 42 is such that the sealing portion 42 extends slightly into the sump 14 in use. The sealing portion 42 is typically threaded so as to form a tight seal with a correspondingly threaded opening of the sump 14 during use. Additionally or alternatively, the sealing portion may comprise a resiliently deformable sealing material.

Each of the inlet 44 and outlet 46 formations have substantially the same form. Each of the inlet 44 and outlet 46 formations have a substantially constant circular cross-section, such that the inlet 44 and outlet 46 formations are substantially tubular/cylindrical in form. The inlet 44 and outlet 46 formations are hollow, such that the interior of the inlet 44 and outlet 46 formations define flow passages. The inlet 44 and outlet 46 formations are shaped and dimensioned so as to engage corresponding end formations of the second inlet pipe 22 and the first outlet pipe 20 respectively.

The inlet 44 and outlet 46 formations extend through the body of the plug 38, for example in a direction of a central axis of the plug 38. The inlet 44 and outlet 46 formations extend to either side of, and through, a central region of each of the grip portion 40 and the sealing portion 42. Thus the inlet 44 and outlet 46 formations may be in fluid communication with the interior of the sump during use. The inlet 44 and outlet 46 formations are held within the grip 40 and sealing 42 portions such that they are adjacent to each other. The inlet formation 44 and the outlet formation 46 are axially offset, such that the inlet formation 44 extends a greater distance into the sump 14 than the outlet formation 46 during use. Thus oil entering the sump 14 from the inlet formation 44 is prevented from being immediately drawn out through the outlet formation 46. In this example, the inlet and outlet tubes may be of substantially the same length but longitudinally offset, for example so as to give a visual indication of which is the inlet and outlet from the exterior of the engine.

In use a user may simply insert the sump plug 38 into a corresponding aperture in the sump 14 such that the sealing portion 42 fills the aperture and the inlet 44 and outlet 46 formations are located in the desired position within the sump 14. The nature of the sump plug 38 is beneficial in that it may directly replace the existing sump plug of a diesel generator. This thereby allows the sump plug 38 to be retrofitted to existing diesel generators, allowing for use with the system 100 of the second embodiment, and the benefits that such a system 100 provides.

A similar sump plug could be provided for the embodiment of FIGS. 1 and 2 but having only an inlet passage or outlet formation therein into the sump 14 instead of both an inlet and outlet. Furthermore, in other examples of the invention, it is possible that the oil inlet into the engine sump 14, could be provided by a conventional oil filler port, such as the filler or dipstick port in a conventional diesel engine. A plug or adapter similar to that of FIG. 6, but typically having only the inlet formation 44 running there through could be provided for fitment with any such conventional or bespoke engine port as required. Whilst a sump plug is a convenient device for retrofitting a connector to an existing engine oil system, it is possible that bespoke connectors could be implemented for the invention if preferred.

In any of the above examples, the sump plug may be used to provide only an engine outlet port 46. The inlet and/or outlet ports in any example are typically configured to provide connector formations for the oil delivery tubing (i.e. oil flow lines) for the system once connected up for use.

In examples of the invention for a 3 kVA to 10 kVA generator set, the internal sump oil capacity may be between 0.5 and 2.5 liters. The oil reservoir may have a corresponding oil capacity (internal volume) of between 3-6 times larger than the internal sump.

In order to circulate oil throughout either of the systems 10, 100 described above, a suitable oil pump could be located anywhere in the flow path of the system, and possible locations for the inclusion of a pump may include, for example, the interior of the external reservoir 18, or the interior of the sump 14. In the current examples, it is preferred that a pump, separate from conventional internal oil pump 15, is provided in the flow path 20 from the sump 14 to the reservoir 18, or vice versa, typically upstream of an optional oil filter, if it is provided. A pump which is outside of the engine housing itself for use with the present invention is beneficial for retrofitting the invention to conventional engines. The pump 16 may or may not be an electric pump. The pump 16 may be mounted to a common support structure of the engine/generator 12 and/or reservoir 18.

Any such pump may be provided where the sump outlet is below the inlet or else where the action of gravity and/or conventional oil pump 15 is insufficient to drive the flow around the system comprising the reservoir 18 according to the invention.

Any of the control options for the controller 23 in FIG. 5 may be as described above for the controller 23 of FIG. 1. Either embodiment allows the option of closing valve(s) 17 so as to isolate the external reservoir 18 from the engine oil system during engine operation if desired. In some examples, the valve(s) may be closed in normal use and may be opened selectively only for a predetermined time period when flow to/from the oil reservoir is required. In one example, which is well suited to retrofit implementation, the valve(s) 17 may be closed for substantially the entire duration of engine operation to isolate the reservoir 18 from the engine oil system and may be opened to allow oil flow to/from the reservoir only upon cessation of engine operation. Corresponding control constraints may be applied to pump 16. Even in such embodiments, it is possible the controller 23 may permit the flow of oil from the reservoir to the sump, e.g. to top up the level of oil in the sump if it is determined that the oil level in the engine has fallen below an acceptable level. Similarly such an operation could be performed after an instance of engine use (e.g. when the oil in the sump has settled). Such a flow may occur under gravity or else the pump 16 may be located in the flow line 22 instead of flow line 20 if required for this purpose.

In any example of the invention, oil may be pumped between the reservoir 18 and sump 14 for a predetermined period of time before shutting off the valve(s) 17 and/or pump 16. The predetermined time period may be set such that a sufficient volume of oil has been delivered to the internal sump 14 so as to replenish the volume of the sump 14 (e.g. to effect an oil change).

In other examples, an internal combustion engine of the type described above could be used to drive stationary equipment, other than a generator, such as a pump, compressor, or other machinery.

The invention claimed is:

1. An engine generator set comprising an electric generator, an internal combustion engine having an internal sump for collecting oil, and an oil reservoir external to the engine, the engine including an oil inlet port opening into the internal sump, and connected to an outlet of the oil reservoir, and an oil outlet port connected to an inlet of the oil reservoir, such that a circuit is defined between the internal sump and the oil reservoir, wherein said flow circuit comprises flow control means for selective control of oil flow between the internal sump and oil reservoir, and the flow control means comprises a shut-off valve and a controller which inhibits opening of the shut-off valve during entire operation of the engine.

2. A generator set according to claim 1, wherein the volume of the oil reservoir is larger than the volume of the internal sump.

3. A generator set according to claim 1, wherein the flow control means comprises a pump adapted to circulate oil from the oil outlet port of the engine to the oil inlet port of the engine via the reservoir.

4. A generator set according to claim 1, wherein the reservoir is configured such that oil flows from the oil outlet port of the engine and/or reservoir to the oil inlet port of the engine at least in part under the action of gravity.

5. A generator set according to claim 1, wherein the shut-off valve is in the flow path between the engine oil outlet port and the oil reservoir inlet.

6. A generator set according to claim 1, wherein the controller inhibits opening of the shut-off valve upon sensing of the one or more engine operation parameter.

7. A generator set according to claim 1, wherein the controller initiates oil flow between the engine and the oil reservoir upon termination of an instance of engine operation or a predetermined time thereafter.

8. A generator set according to claim 1, wherein the controller selectively permits oil flow between the engine and oil reservoir for a predetermined duration or volume of oil flow.

9. A generator set as claimed in claim 1, wherein the oil reservoir is thermally separated or isolated from the engine.

10. A generator set as claimed in claim 1, wherein the oil reservoir comprises at least one internal formation or baffle defining a tortuous flow path for oil flowing in the circuit.

11. A generator set according to claim 1, comprising a filter located in the flow path from the engine oil outlet port to the engine oil inlet port externally to the engine.

12. A generator set according to claim 1, wherein the engine oil outlet port extends from the internal sump.

13. A generator set according to claim 1, wherein the internal sump comprises an opening for filling and/or draining oil from the sump, the internal combustion engine further comprising a formation for attachment to said opening for receiving either or both of the oil inlet port and the oil outlet port.

14. A generator set according to claim 13, wherein the formation takes the form of a removable plug or cap.

* * * * *